Patented Apr. 4, 1950

2,502,618

UNITED STATES PATENT OFFICE 2,502,618

PURIFYING SULFONIC ACIDS

Paul R. Fields, Chicago, Ill., assignor to Standard Oil Company, Chicago, Ill., a corporation of Indiana No Drawing. Application October 22, 1946, Serial No. 704,983

15 Claims. (Cl. 260—513)

This invention relates to a process for purifying crude sulfonic acids containing impurities such as nitrogen oxides, sulfur dioxide, nitrosylsulfonic acids, sulfoxides and the like. More particularly, it relates to the purification of alkanesulfonic acids containing one or more of the above mentioned impurities, said sulfonic acids being derived from a nitrogen oxide-catalyzed oxidation of alkyl or cycloalkyl mercaptans or compounds having the formula $R_1S_nR_2$ wherein $R_1$ and $R_2$ are aliphatic hydrocarbon radicals, which may be identical.

Alkyl and cycloalkyl mercaptans can be oxidized to the corresponding sulfonic acids by a gas stream containing free oxygen, for example, air, and a small catalytic quantity of a nitrogen oxide selected from the group consisting of NO, $NO_2$, $N_2O_3$, $N_2O_4$ and $N_2O_5$ at temperatures below about 300° F., preferably between about 50° F. and about 120° F., and at pressures between about 5 and about 50 p. s. i. g., as described and claimed in application for Letters Patent Serial No. 718,900 filed by Wayne A. Proell and Bernard H. Shoemaker on December 27, 1946.

Sulfur compounds having the formula $R_1S_nR_2$ wherein $R_1$ and $R_2$ are hydrocarbon radicals and $n$ is an integer having a value between 1 and 6, preferably having a value of 2, can be oxidized to sulfonic acids containing more or less intermediate oxidation products, such as sulfoxides, sulfones and sulfonic anhydrides, by a gas stream containing free oxygen and a catalytic quantity of a nitrogen oxide selected from the group consisting of NO, $NO_2$, $N_2O_3$, $N_2O_4$ and $N_2O_5$ at temperatures between about 20° F. and about 250° F., and pressures between about 5 and about 50 p. s. i. g., as described and claimed in Letters Patent 2,433,395, issued to Wayne A. Proell and Bernard H. Shoemaker on December 30, 1947. The oxidation can be conducted in two stages to obtain maximum efficiency, the first stage being operated at temperatures between about 20° C. and about 50° C. to produce a reaction mixture containing between about 40 and about 70 per cent of sulfonic acid, and the second stage operated at temperatures between about 70° C. and about 150° C. to yield a product containing at least 90 weight per cent of sulfonic acid, as described and claimed in Letters Patent 2,433,396, issued to Wayne A. Proell on December 30, 1947.

It has been found that the sulfonic acids produced by the above processes retain appreciable quantities of the nitrogen oxides employed as the oxidation catalysts. Nitrogen oxide retention in the sulfonic acid product is undesirable, since catalyst losses from the oxidation process appreciably increase its expense. Moreover, it is desirable for some purposes to produce nitrogen-free sulfonic acids. It has also been observed that the sulfonic acids produced by the processes described above contain foul smelling impurities. All the undesirable odoriferous impurities have not been isolated and characterized. However, I have observed the presence of sulfur dioxide and of acrid sulfoxides in alkanesulfonic acids produced by the catalytic oxidation of alkyl disulfides in accordance with the process described in U. S. Patent 2,433,395.

In order to increase the commercial utility and salability of the sulfonic acids produced by the above described processes, it is, therefore, necessary to subject them to a purification treatment to remove catalyst and odoriferous impurities.

It was thought that the problem of removing nitrogen oxides from the crude sulfonic acids could be solved simply by heating the acids and simultaneously passing a stripping gas such as air, nitrogen, or carbon dioxide therethrough. An experimental study of this procedure revealed that the ease of removal of nitrogen oxides from crude sulfonic acids by stripping depends to a large extent on the concentration of the sulfonic acid in the crude oxidation product; the higher the acid strength the more difficult it was to remove nitrogen oxides therefrom by stripping and heating. One of the outstanding advantages of the above described processes for the production of sulfonic acids is that it is possible directly to produce high strength, substantially anhydrous sulfonic acids thereby. Dilution of the crude oxidation product with water to reduce the acid strength is, therefore, extremely undesirable, even though such dilution would aid in the removal of nitrogen oxides from the product.

Furthermore, it has been observed that it is usually necessary to heat crude sulfonic acids to temperatures between about 230° F. and about 260° F. in order to remove nitrogen oxides therefrom within a reasonable period of time varying from about 10 minutes to about 1½ hours. In the employment of the heating and stripping procedure it has also been observed that substantial proportions of nitrogen oxides are very tenaciously retained in the crude sulfonic acids, strongly suggesting the possibility that some proportion of the nitrogen oxides, at least, are contained in the crude oxidation product in the form of nitrosylsulfonic acids. In addition, it has been noted that some batches of sulfonic acids, produced by the processes mentioned above, on standing undergo some process which binds nitrogen oxides so that blowing with a stripping gas such as air at temperatures between 180° F. and 260° F. fails to remove nitrogen oxides. As an example, a sample of methanesulfonic acid produced by the oxidation of dimethyl disulfide in the presence of $NO_2$ and containing about 5 per cent by weight of $NO_2$ was blown with air for several hours at 260° F. and lost only a trace of $NO_2$. It was also observed that the removal of nitrogen oxides from crude sulfonic acids by heating and stripping was followed very rapidly by darkening of the sulfonic acid product.

The possibilities of electrolytically removing nitrogen oxides from crude sulfonic acids produced by the above described processes were then investigated. Upon subjecting the crude sulfonic acid solutions to electrolysis with direct or alternating electric current, it was found that nitrogen oxide removal could be accomplished but that a portion of the sulfonic acid in the crude reaction product was oxidized simultaneously to sulfuric acid. For some applications it is desirable to produce sulfonic acids of low ash (sulfate) content and the electrolytic purification procedure is, therefore, not generally applicable.

It is an object of this invention to provide a process for purifying sulfonic acids containing impurities such as nitrogen oxides, nitrosylsulfonic acids, sulfur dioxide and intermediate oxidation products such as sulfoxides. Another object of my invention is to provide a process for removing nitrogen oxides and odoriferous impurities from alkanesulfonic acids, particularly from alkanesulfonic acids containing between 1 and 5 carbon atoms in the alkyl group. An additional object of my invention is to provide a process for the elimination of nitrogen oxides and malodorous impurities from crude alkanesulfonic acids produced by the oxidation of mercaptans or sulfides with a gas containing free oxygen and a catalytic quantity of a nitrogen oxide selected from the group consisting of NO, $NO_2$, $N_2O_3$, $N_2O_4$ and $N_2O_5$. These and other objects of my invention will become apparent from the ensuing description thereof.

In accordance with this invention the crude sulfonic acid, particularly an alkanesulfonic acid, containing one or more impurities such as nitrogen oxides, sulfur dioxide, nitrosylsulfonic acids and malodorous intermediate oxidation products, e. g. sulfoxides, is contacted in the liquid phase with an immiscible olefinic material, particularly a mono-olefin hydrocarbon containing at least about eight carbon atoms in the molecule. Suitably, I may employ mono-olefinic hydrocarbons containing between eight and thirty carbon atoms in the molecule. The olefinic material is caused intimately to contact the crude sulfonic acid, for example by mechanical stirring or other known methods of contacting, whereby interaction occurs between the aforementioned impurities and the olefinic material. The precise nature of the interaction is not known and it may be both chemical and physical; at any rate, impurities are withdrawn from the crude sulfonic acid into the olefinic material, which can thereafter be separated from the resultant purified sulfonic acid.

Contacting is usually effected at ambient temperatures, but in general temperatures between about 0° F. and about 75° F. may be employed. Contacting should be effected at temperatures sufficiently low to avert the occurrence of substantial polymerization of the olefinic material being employed or its esterification by the sulfonic acid. Naturally the choice of a suitable contacting temperature in a particular case will depend upon the identity and strength of the particular sulfonic acid and the particular olefin being employed. In general, I prefer to employ temperatures between about 32° F. and about 75° F.

The contacting operation of this invention can be effected in a single stage or in multiple stages, with or without separation of partially purified sulfonic acid between stages. When multistage contacting operations are employed, different olefinic materials can be employed in different stages and various operating temperatures may be selected for the various stages of contacting. Countercurrent or concurrent flow contacting, as employed in the extraction of hydrocarbon oils with selective solvents, may be employed.

The ratio of olefinic material to the sulfonic acid in the contacting operation will depend upon the particular olefin and acid, the acid strength, the contacting temperature and the rate of purification which it is desired to obtain. Ordinarily I employ between about 10 and about 200 weight per cent by weight of olefinic material based on the weight of the crude sulfonic acid which is being purified.

Following the contacting operation, the duration of which can vary from about one second to several hours or more, the contacting mixture is allowed to separate into two immiscible layers, for example by gravity settling, centrifuging or the like. One of the liquid layers comprises olefinic material containing various impurities or products formed by reactions of impurities with olefinic material. The other liquid layer comprises a purified sulfonic acid. The used olefinic material may be purified, as by distillation, and employed to purify further quantities of crude sulfonic acid.

The purified sulfonic acids produced by the process of this invention may be further treated. For example, they may be distilled under high vacuum to produce one or more products of narrow boiling ranges, filtered through adsorbent materials such as clays, charcoal, etc.

Lower mono-olefinic hydrocarbons cannot be used in the purification process of this invention. Mono-olefinic hydrocarbons cannot be used in the purification process of this invention. Mono-olefinic hydrocarbons from ethylene through the pentenes dissolve at a fairly rapid rate and in substantial proportions in various sulfonic acids and, in addition, undergo more or less polymerization at moderate temperatures. Thus, propylene dissolves to the extent of 36 mol per cent at atmospheric pressure and room temperature in a mixture of methane-, ethane-, propane- and butane-sulfonic acids having an acid strength of 96 weight per cent. Pentene-1 is completely miscible at a 1:1 weight ratio in butanesulfonic acid having a concentration of 97 weight per cent at atmospheric pressure and room temperature. The solubility of 1-pentene decreases markedly with decrease in acid strength, as evidenced by the fact that its solubility in 80 weight per cent butanesulfonic acid at atmospheric pressure and room temperatures is about 5.5 weight per cent and the acid solubility in 1-pentene under these conditions is only 0.17 weight per cent.

The higher mono-olefinic hydrocarbons are substantially less soluble even in high strength sulfonic acids, as illustrated by the data in the following table. These data were obtained at approximately room temperature 73–84° F.). Solubility data for n-hexane and benzene are submitted for comparative purposes. The sulfonic acids contained small proportions of sulfuric acid, below 1 per cent by weight.

*Table*

| Hydrocarbon | Sulfonic Acid | Sulfonic Acid Conc. (Wt. per cent) | Solubility of Olefin in Acid (Wt. per cent in solution) | Solubility of Acid in Olefin (Wt. per cent in solution) |
|---|---|---|---|---|
| 1-Octene | Butane | 98 | 0.77 | 0.19 |
| Di-isobutylene | Mixed [1] | 95.67 | 3.21 | 0.15 |
| Tri-isobutylene | do [1] | 95.67 | 1.08 | 0.52 |
| Do | Ethane | 97.65 | 2.29 | 0.00 |
| Do | Butane | 97.34 | 8.26 | 0.38 |
| 1-Hexadecene | Mixed [1] | 95.67 | 1.87 | 0.38 |
| Do | Ethane | 97.65 | 2.66 | 0.10 |
| n-Hexane | Mixed [1] | 95.67 | 0.97 | 0.09 |
| Do | Ethane | 97.65 | 1.23 | 0.18 |
| Benzene | Mixed | 95.67 | 26.59 | 5.65 |
| Do | Butane | 79.39 | 11.20 | 0.85 |

[1] A mixture of $C_1$–$C_4$ alkanesulfonic acids.

For the purposes of this invention it is essential that the olefinic material employed be substantially immiscible with the crude sulfonic acid being purified under the purification conditions which are adopted. It may be desirable to effect contacting between the olefinic material and the crude sulfonic acid at a given temperature and to separate the contacting mixture into two liquid phases at a lower temperature, in order to reduce the solubility of the olefinic material in the sulfonic acid.

The olefinic material employed in the present process need not be pure. Thus it is not essential to employ a pure mono-olefinic hydrocarbon. I may employ a mixture of mono-olefinic hydrocarbons with saturated hydrocarbons of the same or different boiling ranges. In addition various organic solvents, for example chlorinated solvents such as carbon tetrachloride and trichloroethylene, nitroparaffins, or other organic solvents may be employed together with the olefinic material in order to increase the ease of contacting or for other reasons. If desired, the purified sulfonic acid resulting from the treatment of a crude sulfonic acid with olefinic material may be finished by extraction with various solvents, for example petroleum ether, hexane, or other solvents to remove residual color-bearing materials.

Examples of olefins suitable for use in purification of crude sulfonic acids, particularly alkanesulfonic acids containing between about 1 and 5 carbon atoms in the molecule and having an acid strength between about 80 and about 99 per cent by weight, are octenes, for example diisobutylene, decenes, dodecenes, tridecenes, hexacenes, and the like. Olefin hydrocarbons suitable for use in the present process can be produced by known methods, for example, the treatment of paraffinic hydrocarbons by thermal cracking, catalytic cracking or catalytic dehydrogenation; by thermal or catalytic polymerization of mono-olefinic hydrocarbons; by dehydrohalogenation of various alkyl halides; by deamination of various amines, for example, primary or secondary hexadecylamines by thermal treatment; by dehydration of alcohols; by the Fischer-Tropsch process for the catalytic hydrogenation of carbon monoxide, and the like.

The following examples are intended to illustrate, but not to limit, the process of my invention.

Example 1

Crude methanesulfonic acid was produced by the catalytic oxidation of dimethyl disulfide with air and a catalytic quantity of $NO_2$. The crude acid contained nitrogen oxides, some sulfur dioxide and intermediate oxidation products such as sulfoxides having objectionable odors. The crude acid (98% strength) was mixed at room temperature (about 75° F.) with about an equal volume of di-isobutylene (essentially a mixture of 2,4,4,-trimethyl-1-pentene and 2,4,4,-trimethyl-2-pentene), which is equivalent to about 50 weight per cent of di-isobutylene based on the weight of sulfonic acid. The mixture was stirred for a few seconds and then allowed to separate by gravity into two layers, viz., an upper layer of di-isobutylene containing extracted materials or reaction products and a lower layer of the purified methanesulfonic acid. The crude sulfonic acid gave a positive test for $NO_2$ with ferrous sulfate but the purified sulfonic acid gave a negative test. The purified acid also had a much more pleasant odor, $SO_2$ being absent and also some of the intermediate partial oxidation products.

Example 2

Diisobutylene (10 cc.) was dissolved in 50 cc. of hexane. This mixture was added to 50 grams of methanesulfonic acid containing approximately 10 percent by weight of $NO_2$ not removable by air stripping. The methanesulfonic acid had been chilled to 0° C. before contacting with the diisobutylene solution. The acid was contacted with the mixture of olefin and hexane for 30 seconds in a cooling bath maintained at 0° C. The hydrocarbon layer was then separated by settling from the acid and the acid was blown with air to remove organic material. The resulting acid solution was dark brown in color and gave a positive test for $NO_2$ upon the application of ferrous sulfate reagent. Since all the $NO_2$ was not removed, this experiment was repeated with the exception that the contact time was increased to 5 minutes; the resulting acid gave a negative test for $NO_2$ with ferrous sulfate.

Example 3

Methanesulfonic acid (100 grams) containing approximately 10 weight percent of firmly bound $NO_2$ was contacted at 0° C. for 30 minutes with a solution of 30 cc. of diisobutylene in 150 cc. of hexane. The product separation procedure employed in Example 2 was followed and the acid product was separated and tested for $NO_2$ with ferrous sulfate, giving a negative test.

Example 4

Methanesulfonic acid (50 grams) containing approximately 10 weight percent of firmly bound $NO_2$ was contacted at 20° C. for 5 minutes with a solution of 10 cc. of diisobutylene in 50 cc. of hexane, following which the product separation procedure of Example 2 was pursued. An acid giving a negative ferrous sulfate test for $NO_2$ resulted.

Having thus described my invention, what I claim is:

1. A process for purifying a crude alkanesulfonic acid containing impurities including nitrogen oxides and sulfoxides, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting the crude alkanesulfonic acid in the liquid phase with a substantially immiscible liquid monoolefinic hydrocarbon at a temperature sufficiently low to avert substantial polymerization of said olefinic hydrocarbon, and thereafter separating a purified sulfonic acid.

2. The process of claim 1 wherein the alkanesulfonic acid contains between 1 and 5 carbon atoms in the molecule.

3. A process for purifying a crude alkanesulfonic acid containing 1 to 5 carbon atoms in the alkyl group and having an acid strength between about 80 and about 99 per cent by weight, said alkanesulfonic acid containing a nitrogen oxide which can not be removed by stripping, which process comprises contacting said alkanesulfonic acid in the liquid phase with a substantially immiscible aliphatic, mono-olefinic hydrocarbon containing at least 8 carbon atoms in the molecule at a temperature between about 32° F. and about 75° F. for a period of time sufficient to transfer a substantial proportion of said nitrogen oxide into the olefinic hydrocarbon phase, thereafter separating a purified alkanesulfonic acid from said immiscible mono-olefinic hydrocarbon containing said nitrogen oxide.

4. A process for purifying a crude alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said alkanesulfonic acid in the liquid phase with a substantially immiscible liquid mono-olefinic hydrocarbon at a temperature sufficiently low to avert substantial polymerization of said olefinic hydrocarbon, and thereafter separating a purified sulfonic acid and a hydrocarbon layer containing said malodorous intermediate oxidation product.

5. The process of claim 4 wherein the intermediate oxidation product is a sulfoxide.

6. The process of claim 4 wherein the olefinic hydrocarbon is an aliphatic mono-olefinic hydrocarbon containing at least 8 carbon atoms in the molecule.

7. A process for purifying a crude alkanesulfonic acid having an acid strength between about 80 and about 99 per cent by weight, said alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said alkanesulfonic acid in the liquid phase with a substantially immiscible liquid mono-olefinic hydrocarbon at a temperature sufficiently low to avert substantial polymerization of said olefinic hydrocarbon, and thereafter separating a purified alkanesulfonic acid and a hydrocarbon layer comprising said malodorous intermediate oxidation product.

8. A process for purifying a crude alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said sulfonic acid in the liquid phase with a substantially immiscible liquid mono-olefinic hydrocarbon at a temperature between about 0° F. and about 75° F., and thereafter separating a purified alkanesulfonic acid and a hydrocarbon layer comprising said malodorous intermediate oxidation product.

9. A process for purifying a crude alkanesulfonic acid having an acid strength between about 80 and about 99 per cent by weight, said alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said alkanesulfonic acid in the liquid phase with a substantially immiscible liquid mono-olefinic hydrocarbon at a temperature between about 0° F. and about 75° F., and thereafter separating a purified alkanesulfonic acid and a hydrocarbon layer comprising said malodorous intermediate oxidation product.

10. A process for purifying a crude alkanesulfonic acid having an acid strength between about 80 and about 99 per cent by weight, said alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said alkanesulfonic acid in the liquid phase with a substantially immiscible mono-olefinic hydrocarbon containing 8 to 30 carbon atoms in the molecule at a temperature between about 0° F. and about 75° F., and thereafter separating a purified alkanesulfonic acid and a hydrocarbon layer comprising said malodorous intermediate oxidation product.

11. A process for purifying a crude alkanesulfonic acid containing 1 to 5 carbon atoms in the alkyl group and having an acid strength between about 80 and about 99 per cent by weight, said alkanesulfonic acid containing a malodorous intermediate oxidation product, said alkanesulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, which process comprises contacting said alkanesulfonic acid in the liquid phase with a substantially immiscible mono-olefinic hydrocarbon containing 8 to 30 carbon atoms in the molecule at a temperature between about 0° F. and about 75° F., and thereafter separating a purified alkanesulfonic acid and a hydrocarbon layer comprising said malodorous intermediate oxidation product.

12. A process for purifying a crude alkanesulfonic acid containing impurities including nitrogen oxides and sulfoxides, said alkanesulfonic acid being derived from a nitrogen oxide-catalyzed oxidation of an aliphatic sulfur compound having the formula $R_1S_nR_2$ wherein $R_1$ and $R_2$ are alkyl radicals and $n$ is an integer having the value of 2, which process comprises contacting the crude alkanesulfonic acid in the liquid phase with a substantially immiscible liquid mono-olefinic hydrocarbon at a temperature sufficiently low to avert substantial polymerization of said olefinic hydrocarbon, and thereafter separating a purified alkanesulfonic acid.

13. A process for purifying a crude alkanesulfonic acid containing a malodorous intermediate oxidation product, said alkanesulfonic acid being derived from a nitrogen oxide-catalyzed oxidation of an aliphatic sulfur compound having the formula $R_1S_nR_2$ wherein $R_1$ and $R_2$ are alkyl radicals and $n$ is an integer having the value of 2, which process comprises contacting said alkanesulfonic acid in the liquid phase with a substantially immiscible liquid mono-olefinic hydrocarbon at a temperature sufficiently low to avert substantial polymerization of said olefinic hydrocarbon, and thereafter separating a purified alkanesulfonic acid and a hydrocarbon layer containing said malodorous intermediate oxidation product.

14. A process for purifying a crude alkanesulfonic acid containing a malodorous intermediate oxidation product, said alkanesulfonic acid being derived from a nitrogen oxide-catalyzed oxidation of an aliphatic sulfur compound having the formula $R_1S_nR_2$ wherein $R_1$ and $R_2$ are alkyl radicals and $n$ is an integer having the value of 2, which process comprises contacting said sulfonic acid in the liquid phase with a substantially immiscible liquid mono-olefinic hydrocarbon at a temperature between about 0° F. and about 75° F., and thereafter separating a purified alkanesulfonic acid and a hydrocarbon layer comprising said malodorous intermediate oxidation product.

15. A process for purifying a crude alkanesulfonic acid containing 1 to 5 carbon atoms in the alkyl group and having an acid strength between about 80 and about 99 percent by weight, said alkanesulfonic acid containing a malodorous intermediate oxidation product, said alkanesulfonic acid being derived from a nitrogen oxide-catalyzed oxidation of an aliphatic sulfur compound having the formula $R_1S_nR_2$ wherein $R_1$ and $R_2$ are alkyl radicals containing 1 to 5 carbon atoms, inclusive, in the alkyl group and $n$ is an integer having the value of 2, which process comprises contacting said alkanesulfonic acid in the liquid phase with a substantially immiscible mono-olefinic hydrocarbon containing 8 to 30 carbon atoms in the molecule at a temperature between about 0° F. and about 75° F., and thereafter separating a purified alkanesulfonic acid and a hydrocarbon layer comprising said malodorous intermediate oxidation product.

PAUL R. FIELDS.

REFERENCES CITED

The following references are of record in the file of this patent:

UNITED STATES PATENTS

| Number | Name | Date |
|---|---|---|
| 2,231,594 | Profft | Feb. 11, 1941 |
| 2,295,612 | Soday | Sept. 15, 1942 |
| 2,383,120 | Fessler | Aug. 21, 1945 |

Certificate of Correction

Patent No. 2,502,618                       April 4, 1950

PAUL R. FIELDS

It is hereby certified that errors appear in the printed specification of the above numbered patent requiring correction as follows:

Column 4, lines 51, 52, and 53, strike out the sentence "Mono-olefinic hydrocarbons cannot be used in the purification process of this invention."; column 5, line 4, insert an opening parenthesis before "73–84°"; line 61, for "hexacenes" read *hexadecenes*;

and that the said Letters Patent should be read with these corrections therein that the same may conform to the record of the case in the Patent Office.

Signed and sealed this 4th day of July, A. D. 1950.

[SEAL]

THOMAS F. MURPHY,
                          *Assistant Commissioner of Patents.*